(12) United States Patent
Sugamoto et al.

(10) Patent No.: US 12,084,136 B2
(45) Date of Patent: Sep. 10, 2024

(54) VEHICLE STEERING GUIDE TORQUE CONTROL APPARATUS

(71) Applicant: TOYOTA JIDOSHA KABUSHIKI KAISHA, Toyota (JP)

(72) Inventors: Shusaku Sugamoto, Toyota (JP); Satoshi Inoue, Anjo (JP); Takeshi Hamaguchi, Seto (JP); Shintaro Saigo, Nisshin (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 274 days.

(21) Appl. No.: 17/840,793

(22) Filed: Jun. 15, 2022

(65) Prior Publication Data
US 2023/0008425 A1   Jan. 12, 2023

(30) Foreign Application Priority Data
Jul. 6, 2021 (JP) ................................. 2021-112380

(51) Int. Cl.
| | | |
|---|---|---|
| B62D 6/00 | (2006.01) | |
| B60W 30/095 | (2012.01) | |
| B60W 30/12 | (2020.01) | |
| B60W 30/18 | (2012.01) | |

(52) U.S. Cl.
CPC ............ *B62D 6/002* (2013.01); *B60W 30/095* (2013.01); *B60W 30/0956* (2013.01); *B60W 30/12* (2013.01); *B60W 30/18145* (2013.01)

(58) Field of Classification Search
CPC ............... B60W 30/08; B60W 30/095; B60W 30/0956; B60W 30/12; B60W 30/18145; B62D 6/002; B62D 6/008

USPC ..................................................... 701/41, 44
See application file for complete search history.

(56) References Cited

U.S. PATENT DOCUMENTS

| | | | |
|---|---|---|---|
| 2010/0030430 A1 | 2/2010 | Hayakawa et al. | |
| 2011/0251758 A1 | 10/2011 | Kataoka | |
| 2019/0118806 A1* | 4/2019 | Augst | B60W 30/18163 |
| 2019/0367082 A1 | 12/2019 | Sugamoto et al. | |
| 2020/0361460 A1* | 11/2020 | Bartels | B60W 10/184 |
| 2022/0185270 A1* | 6/2022 | Aoki | B60W 40/114 |
| 2023/0234612 A1* | 7/2023 | Naserian | B60W 60/00 701/24 |

(Continued)

FOREIGN PATENT DOCUMENTS

| | | |
|---|---|---|
| JP | 2010-052716 A | 3/2010 |
| JP | 2013-082438 A | 5/2013 |

(Continued)

*Primary Examiner* — Erick R Solis
(74) *Attorney, Agent, or Firm* — Dinsmore & Shohl LLP

(57) ABSTRACT

A control unit that controls a reaction force actuator that applies steering guide torque to a steering wheel: calculates, based on a curvature of a curve of a travel road in front of a vehicle detected by a camera sensor, a target steering angle for causing the vehicle to travel along the curve; calculates a target steering guide torque, based on a deviation between the target steering angle that was calculated a prediction time period earlier and an actual steering angle; adjusts a target steering guide torque such that the target steering guide torque becomes smaller as a probability that a driver performs steering operation to deviate from a lane becomes higher; and controls the reaction force actuator such that the steering guide torque becomes the target steering guide torque.

5 Claims, 7 Drawing Sheets

(56) References Cited

U.S. PATENT DOCUMENTS

2023/0334869 A1\* 10/2023 Aoki .................... G06V 40/103

FOREIGN PATENT DOCUMENTS

| JP | 2015-009644 A | 1/2015 |
| JP | 2016-107810 A | 6/2016 |
| JP | 2019-209844 A | 12/2019 |
| WO | 2011111121 A1 | 9/2011 |

\* cited by examiner

VEHICLE STEERING GUIDE TORQUE CONTROL APPARATUS

CROSS-REFERENCE TO RELATED APPLICATION

This application claims priority to Japanese Patent Application No. 2021-112380 filed on Jul. 6, 2021, incorporated herein by reference in its entirety.

BACKGROUND

1. Technical Field

The disclosure relates to a steering guide torque control apparatus for a vehicle such as an automobile.

2. Description of Related Art

As a steering reaction torque control apparatus for a vehicle such as an automobile, a steering reaction torque control apparatus is known that is configured to predict, based on a result of detection by an external sensor, an appropriate steering operation amount to be attained by a driver and, when a steering operation amount attained by the driver corresponding to a prediction time point for the appropriate steering operation amount is not within an appropriate steering operation amount range, make steering reaction torque greater than before until the steering operation amount reaches the appropriate steering operation amount range, as described in, for example, Japanese Unexamined Patent Application Publication No. 2019-209844.

The steering reaction torque acts as steering reaction torque resisting steering operation when the steering operation amount changes from within the appropriate steering operation amount range to outside the range, and acts as steering torque prompting steering operation when the steering operation amount changes from outside the appropriate steering operation amount range to within the range. Accordingly, the steering reaction torque control apparatus according to JP 2019-209844 A may also be referred to as a steering guide torque control apparatus.

As a steering guide torque control apparatus, a steering guide torque control apparatus is known that calculates, based on a curvature of a curve of a travel road in front of a vehicle detected by a camera sensor, a target steering angle for causing the vehicle to travel along the curve, calculates a target steering guide torque guiding steering by a driver, based on a deviation between the target steering angle factoring in a prediction time period and an actual steering angle, such that an actual steering operation amount comes within a predetermined steering operation amount range including a target steering operation amount, and controls a torque application device such that steering guide torque becomes the target steering guide torque.

According to the steering reaction torque control apparatus and the steering guide torque control apparatus as described above, when a vehicle travels along a curve of a travel road, a driver can be prompted to perform steering operation such that an actual steering angle comes within an appropriate steering operation amount range. Accordingly, steering assistance can be rendered such that a steering operation amount attained by a driver becomes an appropriate steering operation amount, while a driver keeps a feeling of performing steering.

SUMMARY

In some cases, a driver performs steering operation to deviate from a lane in which a vehicle is currently traveling, for example, to change a course into a service road, even in a situation where the steering guide torque control apparatus is operating. Since the steering guide torque control apparatus generates a steering guide torque that is appropriate for the vehicle to travel along the current lane, the steering guide torque acts as torque interfering with the deviation from the lane when steering operation to deviation from the lane is performed. Accordingly, the driver cannot help feeling steering resistance caused by the steering guide torque.

A major object of the disclosure is to provide a steering guide torque control apparatus that is improved to reduce the possibility that a driver feels steering resistance caused by steering guide torque in a situation where the driver performs steering operation to deviate from a lane, by adjusting the steering guide torque according to a probability that the driver performs the steering operation to deviate from the lane.

According to the disclosure, a vehicle steering guide torque control apparatus (10) is provided that includes: a steering input member (steering wheel 20) on which steering operation is performed by a driver; a turning device (18) that turns turning tire wheels (28FL, 28FR) according to a steering operation amount applied to the steering input member; a torque application device (reaction force actuator 24) that applies steering guide torque (Tsg) to the steering input member; a control unit (ECU 14) that controls the torque application device; and an image capturing device (camera sensor 46) that acquires an image in front of a vehicle.

The control unit (ECU 14) is configured to: estimate a curvature ($\rho$pre) of a lane in front of the vehicle (60) for causing the vehicle to travel along the lane, based on the image acquired by the image capturing device; calculate a target steering operation amount ($\theta$t), based on the curvature of the lane; calculate a target steering guide torque (Tsgt) guiding steering by the driver, based on a deviation (AO) between the target steering operation amount and an actual steering operation amount ($\theta$), such that the actual steering operation amount comes within a predetermined steering operation amount range including the target steering operation amount; and control the torque application device (reaction force actuator 24) such that the steering guide torque becomes the target steering guide torque.

The control unit (ECU 14) is further configured to: estimate a probability that the driver performs steering operation to deviate from the lane; and adjust the target steering guide torque, according to the probability, such that the target steering guide torque (Tsgt) becomes smaller as the probability becomes higher (S10 to S40).

According to such a configuration, the target steering operation amount is calculated based on the curvature of the lane in front of the vehicle for causing the vehicle to travel along the lane, the target steering guide torque guiding steering by the driver is calculated based on the deviation between the target steering operation amount and the actual steering operation amount such that the actual steering operation amount comes within the predetermined steering operation amount range including the target steering operation amount, and the torque application device is controlled such that the steering guide torque becomes the target steering guide torque. Accordingly, the steering guide torque for causing the vehicle to travel along the lane can be applied to the steering input member, to prompt the driver to perform steering operation such that the actual steering operation amount becomes an appropriate steering operation amount.

Moreover, according to the configuration, the probability that the driver performs steering operation to deviate from the lane is estimated, and the target steering guide torque is adjusted according to the probability such that the target steering guide torque becomes smaller as the probability becomes higher. Accordingly, in a situation where the driver performs steering operation to deviate from the lane, the possibility that the driver feels steering resistance caused by the steering guide torque can be reduced.

When the driver intends to deviate from the lane, for example, to change a course into a service road, the vehicle is decelerated, and vehicle velocity therefore decreases. Moreover, as the number of selectable lanes within a range of a predetermined distance from the vehicle becomes larger, the probability that the driver performs steering operation to deviate from the lane becomes higher. Accordingly, the "probability that the driver performs steering operation to deviate from the lane" may be estimated based on the vehicle velocity, a degree of deceleration of the vehicle, the number of selectable lanes within the range of the predetermined distance from the vehicle, or the like.

Aspects of the Disclosure

In one aspect of the disclosure, the control unit (ECU 14) may be configured to acquire information on vehicle velocity (V), and determine that the lower the vehicle velocity is, the higher the probability is (S90).

According to such an aspect, the lower the vehicle velocity is, the higher the probability is determined. Accordingly, in a situation where the driver performs steering operation to deviate from the lane, the possibility that the driver feels steering resistance caused by the steering guide torque can be reduced by making the target steering guide torque smaller as the vehicle velocity becomes lower.

In another aspect of the disclosure, the control unit (ECU 14) may be configured to acquire information on a degree of deceleration (deceleration amount ΔV) of the vehicle, and determine that the higher the degree of deceleration of the vehicle is, the higher the probability is (S100).

According to such an aspect, the higher the degree of deceleration of the vehicle is, the higher the probability is determined. Accordingly, in a situation where the driver performs steering operation to deviate from the lane, the possibility that the driver feels steering resistance caused by the steering guide torque can be reduced by making the target steering guide torque smaller as the degree of deceleration becomes higher.

Further, in still another aspect of the disclosure, the control unit (ECU 14) may be configured to acquire information on the number (Nr) of selectable lanes within a range (70) of a predetermined distance from the vehicle, set a limit guide torque (Tsgmax) such that the limit guide torque becomes smaller as the number of selectable lanes becomes larger, and limit the target steering guide torque such that a size of the target steering guide torque (Tsgt) does not exceed the limit guide torque (S120 to S140).

According to such an aspect, the limit guide torque is set such as to become smaller as the number of selectable lanes becomes larger, and the target steering guide torque is limited such that the size of the target steering guide torque does not exceed the limit guide torque. Accordingly, the target steering guide torque can be limited such that the size of the target steering guide torque becomes smaller as the number of selectable lanes becomes larger.

Furthermore, in even another aspect of the disclosure, the control unit (ECU 14) may be configured to acquire information on vehicle velocity (V), and make the limit guide torque (Tsgmax) smaller as the vehicle velocity becomes higher (S120).

According to such an aspect, the limit guide torque is made smaller as the vehicle velocity becomes higher. Accordingly, a maximum value of the size of the target steering guide torque can be made smaller as the vehicle velocity becomes higher.

In the above description, components of the disclosure corresponding to embodiments described below are followed by reference signs in parentheses that are used in the embodiments, in order to help in understanding the disclosure. However, each component of the disclosure is not limited to the component in the embodiments corresponding to the added sign in parentheses. Other objects, other features, and accompanying advantages of the disclosure will be easily understood from a description of the embodiments of the disclosure that will be given with reference to the drawings below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram for describing an image capturing reference position and the like;

DETAILED DESCRIPTION OF EMBODIMENTS

Hereinafter, an embodiment of the disclosure is described in detail with reference to the accompanying drawings.

Configuration

Figure 1:
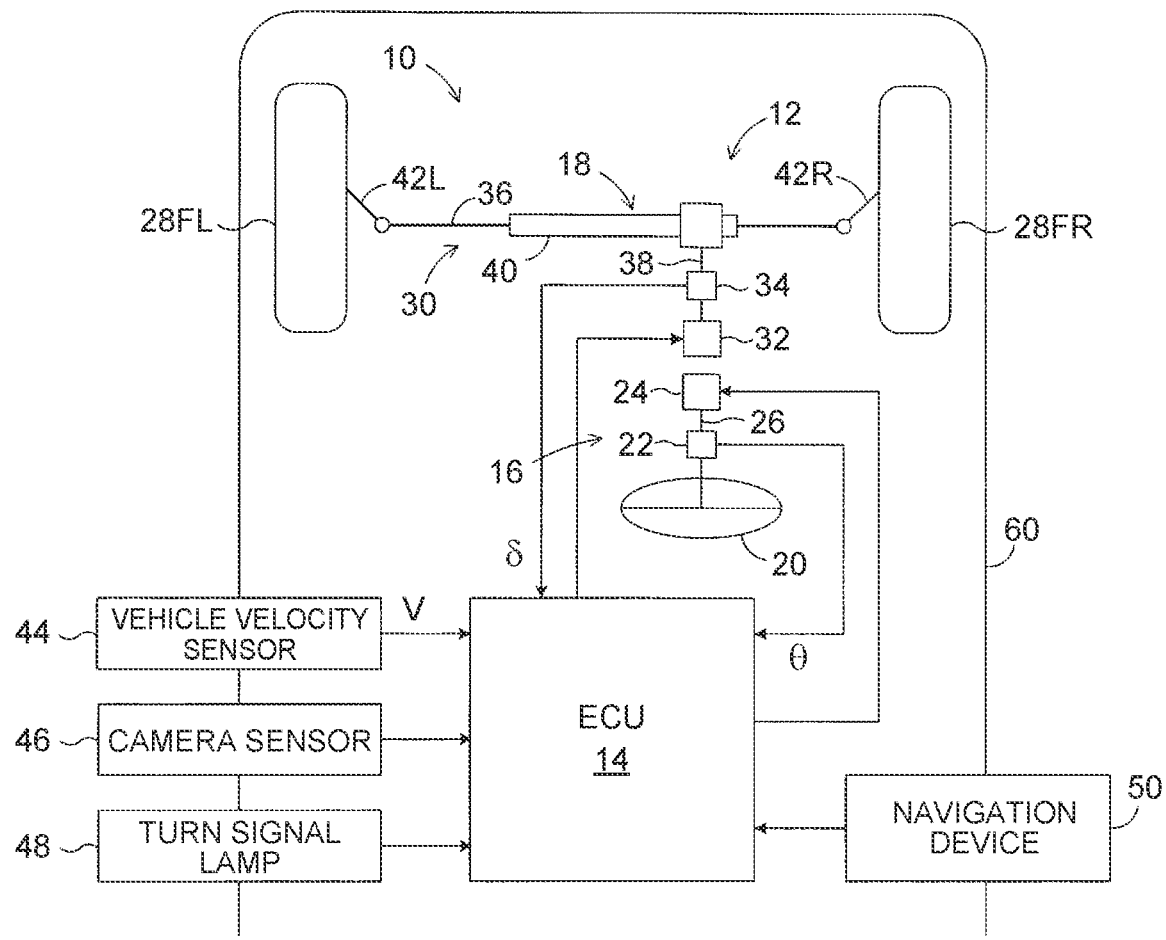
FIG. 1 is a schematic configuration diagram showing an embodiment of a vehicle steering guide torque control apparatus configured as a steering reaction torque control apparatus.

As shown in FIG. 1, a vehicle steering guide torque control apparatus 10 according to the embodiment is configured as a steering reaction torque control apparatus including a steer-by-wire steering system 12 and an electronic control unit 14 that controls the steering system 12, and is applied to a vehicle 60. In the description and the drawings hereinafter, "electronic control unit" is abbreviated to "ECU".

The steering system 12 includes a steering input device 16 and a turning device 18 that are not mechanically connected to each other. The steering input device 16 includes a steering wheel 20, a steering angle detection device 22 that detects a rotation angle of the steering wheel as a steering angle θ, and a reaction force actuator 24 that applies steering reaction torque Tre to the steering wheel.

The steering wheel 20 is a steering input member on which an undepicted driver performs steering operation, and may have a form like a control stick. The reaction force actuator 24 includes an electric motor, and a rotation shaft 26 of the electric motor is integrally joined with the steering wheel 20. The steering angle detection device 22 may be a rotary encoder incorporated in the electric motor.

The turning device 18 includes a turning mechanism 30 configured to receive turning torque Tst and turn left and right front tire wheels 28FL and 28FR, which are turning tire wheels, a turning actuator 32 that applies the turning torque to the turning mechanism, and a turning angle detection device 34 that detects a turning angle δ of the turning tire wheels.

In the depicted embodiment, the turning mechanism 30 includes a rack and pinion device 40 including a rack bar 36 and a pinion shaft 38. The pinion shaft 38 includes an undepicted pinion meshed with rack teeth of the rack bar 36, and rotational motion of the pinion shaft 38 is converted into reciprocating motion of the rack bar 36, and reciprocating motion of the rack bar 36 is converted into rotational motion of the pinion shaft 38. Note that the turning mechanism may have an arbitrary structure publicly known in the art.

Further, the turning mechanism 30 includes tie rods 42L and 42R, and respective inner ends of the tie rods 42L and 42R are pivotally fit to left and right distal ends of the rack bar 36, respectively. Respective outer ends of the tie rods 42L and 42R are pivotally fit to undepicted knuckle arms of the front tire wheels 28FL and 28FR, respectively. The turning actuator 32 includes an electric motor, and a rotation shaft of the electric motor is integrally joined with the pinion shaft 38.

Accordingly, the turning mechanism 30 is configured to turn the front tire wheels 28FL and 28FR by receiving, at the pinion shaft 38, turning torque from the turning actuator 32. There is a certain relationship between a rotation angle φ (not shown) of the pinion shaft 38 and the turning angle δ of the front tire wheels 28FL and 28FR. Accordingly, in the depicted embodiment, the turning angle detection device 34 detects the turning angle δ of the front tire wheels 28FL and 28FR by detecting the rotation angle φ of the rotation shaft of the electric motor for the pinion shaft 38 or the turning actuator 32.

The ECU 14 includes a microcomputer and a drive circuit, details of which are not shown in FIG. 1. The microcomputer includes a CPU, a ROM, a RAM, an interface (I/F), and the like, and has a general configuration in which such components are connected to each other through a common bus.

A signal indicating the steering angle θ detected by the steering angle detection device 22, and a signal indicating the turning angle δ of the front tire wheels 28FL and 28FR detected by the turning angle detection device 34 are input into the ECU 14. Moreover, a signal indicating a vehicle velocity V detected by a vehicle velocity sensor 44, and a signal indicating white line information on a lane in front of the vehicle 60, acquired by a camera sensor 46, are input into the ECU 14. The vehicle velocity sensor 44 detects the vehicle velocity V, for example, based on a speed of the tire wheels.

Further, a signal indicating whether or not a turn signal lamp is blinking is input from the turn signal lamp 48 into the ECU 14, and a signal indicating information on a position of the vehicle 60 and information on a road on which the vehicle is traveling and roads around the road is input from a navigation device 50 into the ECU 14.

Figure 2:
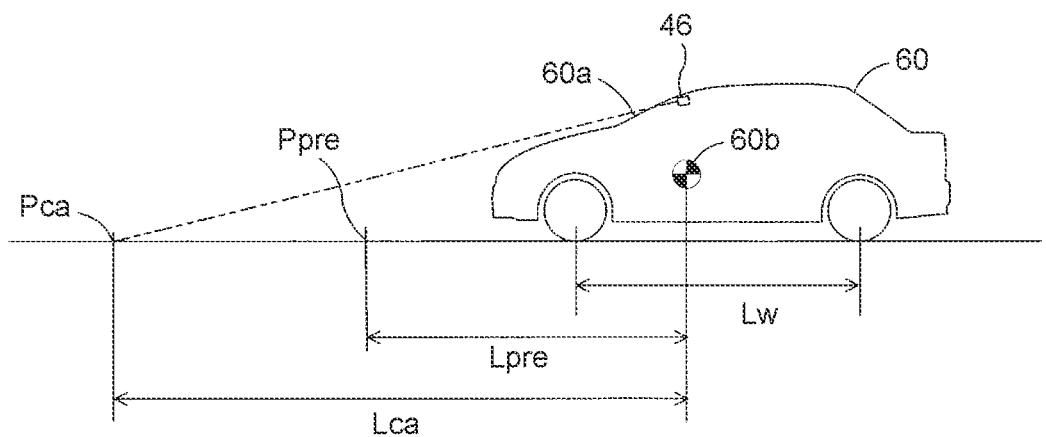

As shown in FIG. 2, the camera sensor 46 is fixed to an upper portion of an inner face of a windshield 60a of the vehicle 60, and captures an image in front of the vehicle 60 centering on an image capturing reference position Pca at a distance Lca (a positive constant) in a forward direction from the center of gravity 60b that is a reference position of the vehicle 60. The distance Lca will be referred to as image capturing reference distance Lca as necessary. The reference position of the vehicle 60 may be a position of the front tire wheels 28FL and 28FR, a middle position between the front wheels and rear wheels, or the like.

The ECU 14 sets a steering gear ratio Rst to a standard steering gear ratio Rstn and controls the turning actuator 32 based on the steering angle θ detected by the steering angle detection device 22. Accordingly, the turning angle δ of the front tire wheels 28FL and 28FR are controlled to be θ/Rstn. Note that the steering angle θ and the turning angle δ are zero when the vehicle 60 is traveling in a straight line, and become positive values when the vehicle 60 makes a left turn. The standard steering gear ratio Rstn is a positive value that is preset such as to become larger as the vehicle velocity V becomes higher, but may be a positive constant.

Moreover, the ECU 14 calculates a basic steering reaction torque Treb that should be applied to the steering wheel 20, based on the steering angle θ, a differential value of the steering angles θ, and a second order differential value of the steering angle θ. The basic steering reaction torque Treb is variably set according to the vehicle velocity such as to become larger as the vehicle velocity V becomes higher. Note that the basic steering reaction torque Treb may be controlled in an arbitrary manner publicly known in the art. For example, the basic steering reaction torque Treb may be a torque corresponding to a steering torque felt by a driver via a steering wheel in a vehicle where the steering wheel is mechanically connected to turning tire wheels and steering assistance torque is applied by a power steering system.

Further, the ECU 14 calculates a target steering guide torque Tsgt guiding steering by the driver when the vehicle 60 travels along a curve of a travel road, which will be described in detail later. Furthermore, the ECU 14 controls the reaction force actuator 24 such that the steering reaction torque Tre to be generated by the reaction force actuator 24 and applied to the steering wheel 20 becomes a target steering reaction torque Tret that is the sum of the basic steering reaction torque Treb and the target steering guide torque Tsgt. Accordingly, the reaction force actuator 24 functions as a torque application device that applies a steering guide torque Tsg corresponding to the target steering guide torque Tsgt to the steering wheel 20. Note that the size of the target steering guide torque Tsgt is approximately one tenth the size of the basic steering reaction torque Treb.

Note that when the driver performs steering to a greater extent such that an actual steering angle θ becomes farther from a target steering angle θt, the target steering guide torque Tsgt acts in a direction in which the steering is restrained, and when the driver performs turn-back steering such that the actual steering angle θ becomes closer to the target steering angle θt, the target steering guide torque Tsgt acts in a direction in which the steering is prompted. Accordingly, the target steering guide torque Tsgt guides steering by the driver such that the actual steering angle θ becomes the target steering angle θt.

In the embodiment, the ECU 14 calculates a curve curvature ρca of a travel road in an area centering on the image capturing reference position Pca, based on the white line information on the lane in front of the vehicle 60 acquired by the camera sensor 46, and stores the curve curvature ρca in the RAM. Accordingly, the camera sensor 46 and the ECU 14 function as a detection device that detects the curve curvature ρca of the travel road in the area centering on the image capturing reference position Pca.

Moreover, the ECU 14 reads, from the RAM, the curve curvature ρca corresponding to a prediction time period Δt as a predicted curve curvature ρpre, calculates the target steering angle θt based on the predicted curve curvature ρpre, and calculates the steering guide torque Tsg based on a deviation Δθ between the target steering angle θt and the actual steering angle θ. The target steering angle θt is a target steering angle for making it easier for the actual steering angle to stay within a range suitable to cause the vehicle 60 to travel along the curve. Note that in the embodiment, a curvature in a direction in which the vehicle 60 makes a left turn is positive.

The curve curvature ρca [1/m] is calculated according to an expression (1) given below. In the expression (1), V is the vehicle velocity [m/s], and $\rho_0$ is the curve curvature [1/m] of the travel road at the center of gravity 60b of the vehicle 60. Accordingly, $\rho_0$ is the curve curvature ρca that was calculated a time period Lca/V earlier and stored in the RAM. The time period Lca/V is a time period that the vehicle 60 requires to travel the image capturing reference distance Lca shown in FIG. 1. Δρ is a rate of change [1/m/m] in the curve curvature ρca calculated the time period Lca/V earlier and stored in the RAM, that is, an amount of change in the curve curvature per unit distance.

$$\rho ca = \rho_0 + V\Delta t\Delta\rho \quad (1)$$

As shown in FIG. 1, a distance (prediction distance) Lpre between the center of gravity 60b of the vehicle 60 and a prediction position Ppre is less than the image capturing reference distance Lca. Note that the prediction distance Lpre does not need to be constant. As can be understood from the description above, the curve curvature ρpre is a curve curvature at the prediction position Ppre, that is, a curve curvature at a position where the center of gravity 60b of the vehicle 60 reaches in the prediction time period Δt.

The target steering angle θt [deg] is calculated according to an expression (2) given below. Note that in the expression (2), Rst is the steering gear ratio as mentioned above, A is a stability factor [deg/(m²/s²)] of the vehicle 60, Lw is a wheel base of the vehicle 60. The stability factor A and the wheel base Lw are known constant values that are determined depending on specifications of the vehicle 60.

$$\theta t = Rst(1+AV^2)\rho preLw \quad (2)$$

Further, the ECU 14 calculates a target basic steering guide torque Tsgtb, based on the steering angle deviation Δθ, which is a deviation (θ−θt) between the actual steering angle θ and the target steering angle θt. The ECU 14 calculates the target steering guide torque Tsgt as the product KvKaTsgtb of a vehicle velocity factor Kv, a correction factor Ka, and the target basic steering guide torque Tsgtb. Furthermore, the ECU 14 controls the reaction force actuator 24 such that the steering reaction torque Tre becomes the target steering reaction torque Tret.

Figure 4:
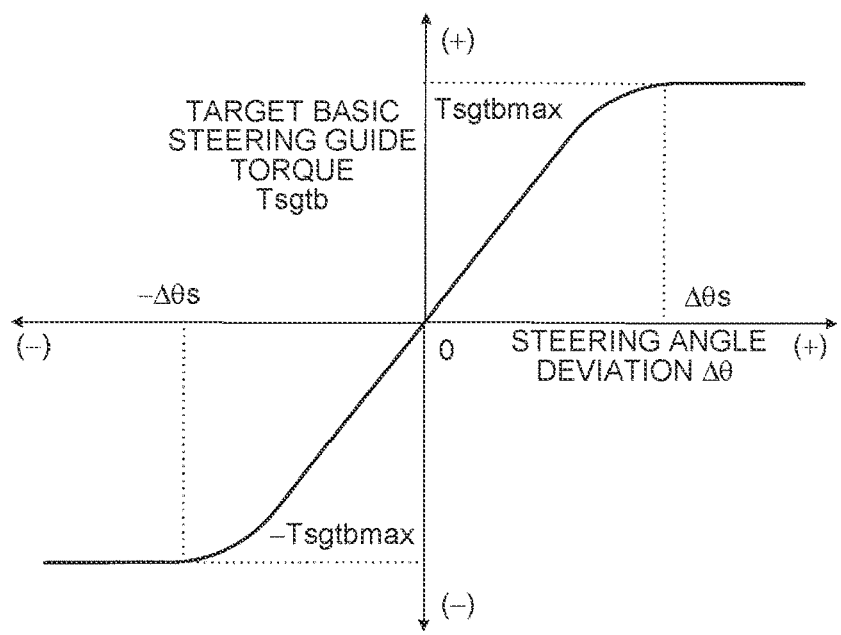
FIG. 4 is a map for calculating a target basic steering guide torque Tsgtb, based on a steering angle deviation Δθ.
Figure 5:
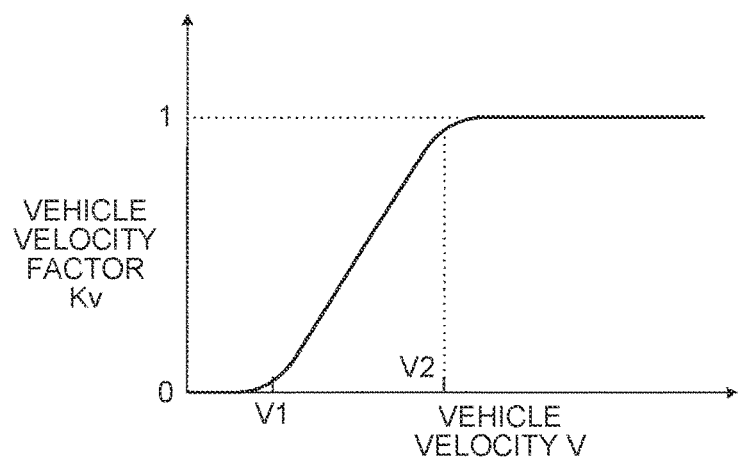
FIG. 5 is a map for calculating a vehicle velocity factor Kv, based on a vehicle velocity V.
Figure 6:
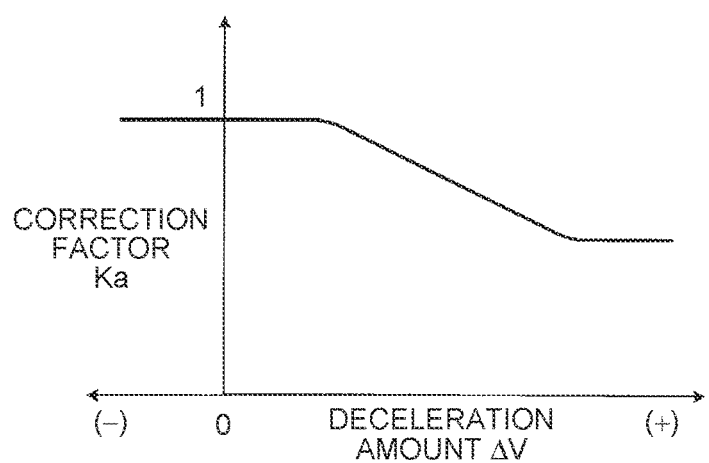
FIG. 6 is a map for calculating a correction factor Ka, based on a deceleration amount ΔV of a vehicle.

Note that the target basic steering guide torque Tsgtb is calculated such as to become larger as the absolute value of the steering angle deviation Δθ becomes larger when the absolute value of the steering angle deviation Δθ is smaller than Δθs, and is calculated such that the absolute value of the target basic steering guide torque Tsgtb is a constant value of Tsgtbmax when the absolute value of the steering angle deviation Δθ is equal to or larger than Δθs, as shown in FIG. 4. The vehicle velocity factor Kv is a value that is not larger than one and is not smaller than zero, and becomes smaller as the vehicle velocity V becomes lower, as shown in FIG. 5. The correction factor Ka is a positive value that is equal to or smaller than one and becomes smaller as a deceleration amount ΔV of the vehicle 60 becomes larger, as shown in FIG. 6.

Steering Reaction Torque Control Routine

Figure 3:
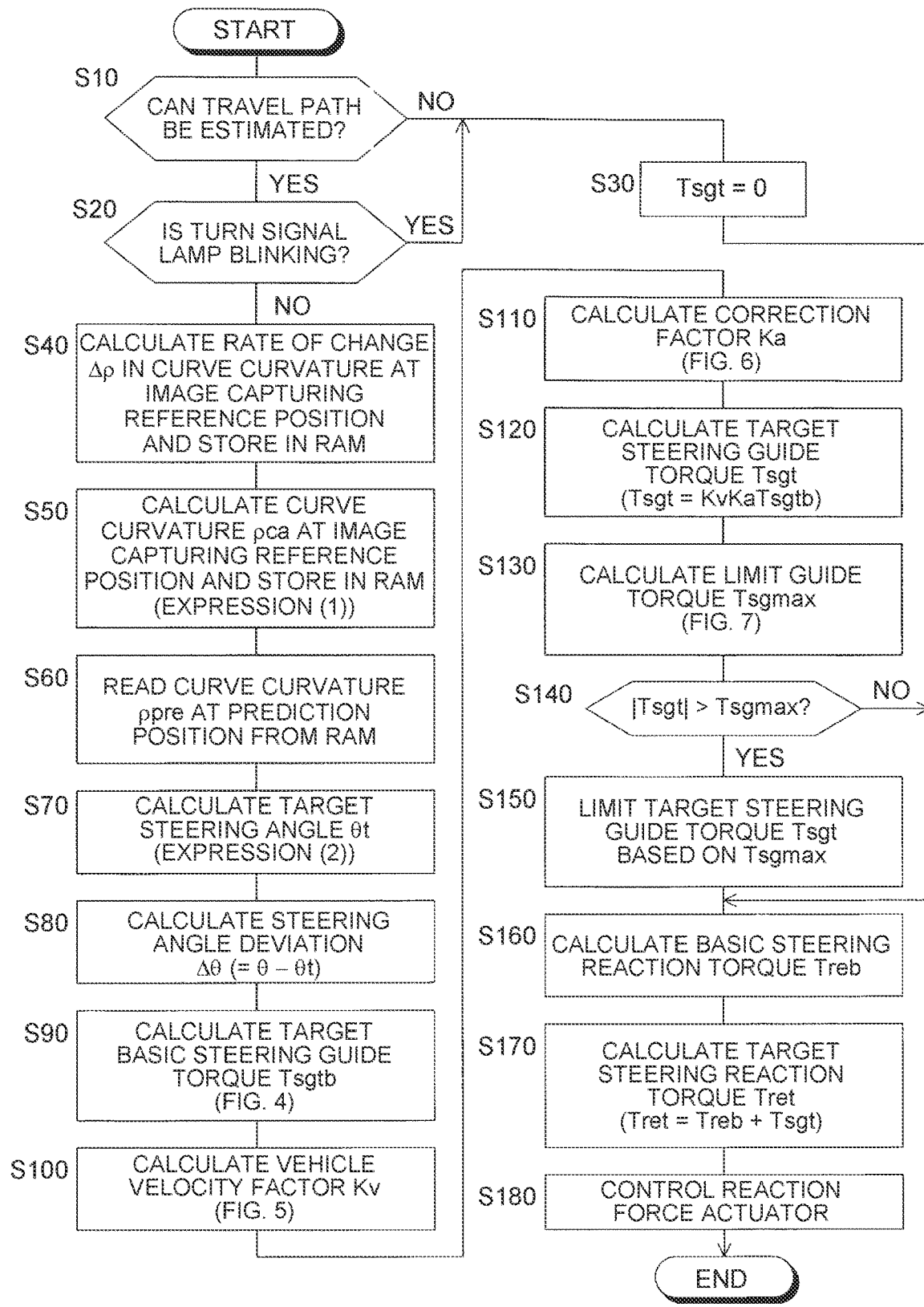
FIG. 3 is a flowchart showing a steering reaction torque control routine in the embodiment.

Next, a steering reaction torque control routine in the embodiment is described. The CPU of the ECU 14 executes the steering reaction torque control routine shown in a flowchart of FIG. 3 when an undepicted ignition switch is on, each time a predetermined time period passes. A control program corresponding to the flowchart of FIG. 3 is stored in the ROM of the ECU 14.

First, in step S10, the white line information on a lane in front of the vehicle 60 is acquired by the camera sensor 46, and the CPU determines whether or not a travel path of the vehicle can be normally estimated. The CPU advances steering reaction torque control to step S30 when negative determination is made, and advances the steering reaction torque control to step S20 when positive determination is made.

In step S20, the CPU determines whether or not the turn signal lamp 48 is blinking, that is, whether or not the driver has determined a lane in which the vehicle is going to travel. The CPU advances the steering reaction torque control to step S40 when negative determination is made. When positive determination is made, the CPU sets the target steering guide torque Tsgt to zero in step S30 and then advances the steering reaction torque control to step S160.

In step S40, the CPU calculates the rate of change Δp in the curve curvature in the area centering on the image capturing reference position Pca, based on the white line information on the lane in front of the vehicle 60 acquired by the camera sensor 46, and stores the calculated rate of change Δp in the RAM.

In step S50, the CPU calculates the curve curvature ρca of the travel road in the area centering on the image capturing reference position Pca in accordance with the expression (1), and stores the calculated curve curvature ρca in the RAM. The curve curvature ρca may be set to zero from when the control is started until the time period Lca/V passes.

In step S60, the CPU reads, from the RAM, the curve curvature ρca that was calculated the prediction time period Δt earlier and stored in the RAM, as the curve curvature ρpre at the prediction position Ppre.

In step S70, the CPU calculates the target steering angle θt as a target steering operation amount for the vehicle 60 to travel along a curve of the travel road in accordance with the expression (2), based on the vehicle velocity V and the curve curvature ρpre at the prediction position Ppre.

In step S80, the CPU calculates the steering angle deviation $\Delta\theta$, which is the deviation ($\theta-\theta t$) between the actual steering angle $\theta$ detected by the steering angle detection device 22 and the target steering angle $\theta t$.

In step S90, the CPU calculates the target basic steering guide torque Tsgtb by referring to the map shown in FIG. 4, based on the steering angle deviation $\Delta\theta$.

In step S100, the CPU calculates the vehicle velocity factor Kv by referring to the map shown in FIG. 5, based on the vehicle velocity V. Note that V1 and V2 shown in FIG. 5 may be, for example, 20 km/h, 60 km/h, respectively. Although the vehicle velocity factor Kv is zero in an area where the vehicle velocity V is low in FIG. 5, the vehicle velocity factor Kv may be a positive value also in the area where the vehicle velocity V is low.

In step S110, the CPU calculates the deceleration amount $\Delta V$ of the vehicle 60 as a deviation between a vehicle velocity V a preset time period earlier and a current vehicle velocity V, and calculates the correction factor Ka by referring to the map shown in FIG. 6, based on the deceleration amount $\Delta V$. As shown in FIG. 6, the correction factor Ka is calculated to be a positive value equal to or smaller than one, and such as to become smaller as the deceleration amount $\Delta V$ becomes larger. The correction factor Ka is set to one when the deceleration amount $\Delta V$ is a negative value, that is, when the vehicle 60 is in an accelerating state, as at a time when the deceleration amount $\Delta V$ is zero or a positive small value.

In step S120, the CPU calculates the target steering guide torque Tsgt guiding steering by the driver when the vehicle 60 travels along the curve of the travel road, as the product KvKaTsgtb of the vehicle velocity factor Kv, the correction factor Ka, and the target basic steering guide torque Tsgtb.

Figure 11:
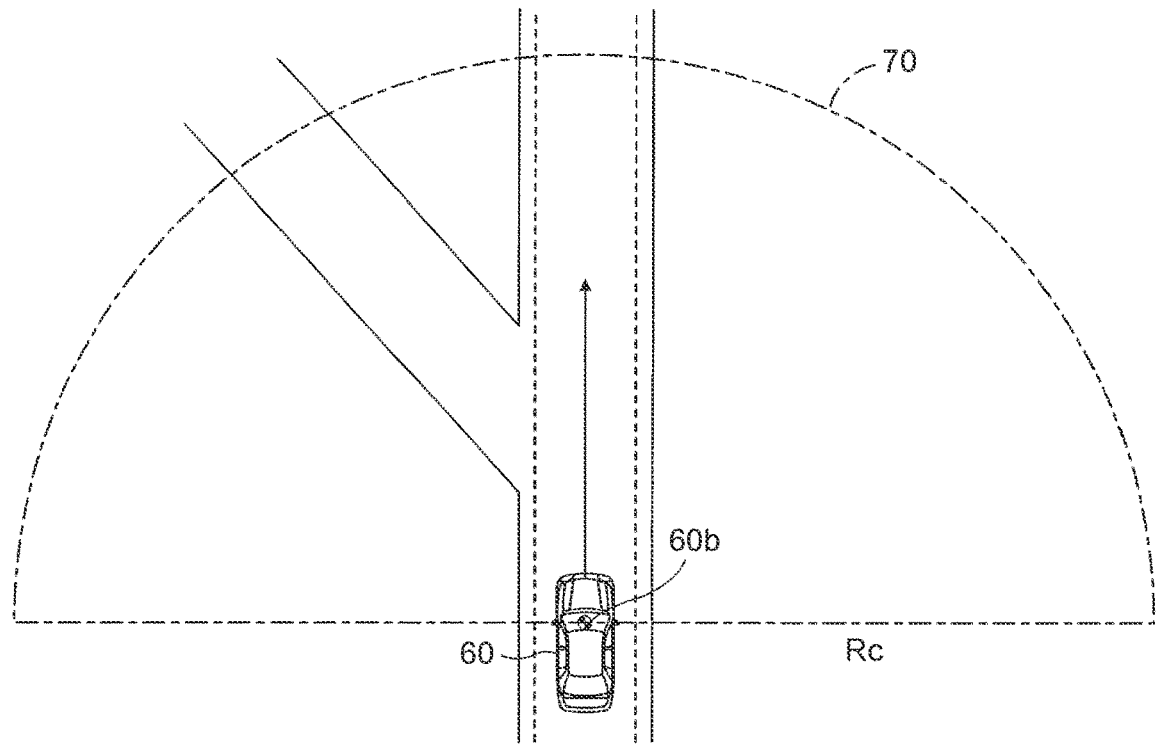
FIG. 11 shows a situation in which there is one service road and the number Nr of selectable lanes is two.
Figure 12:
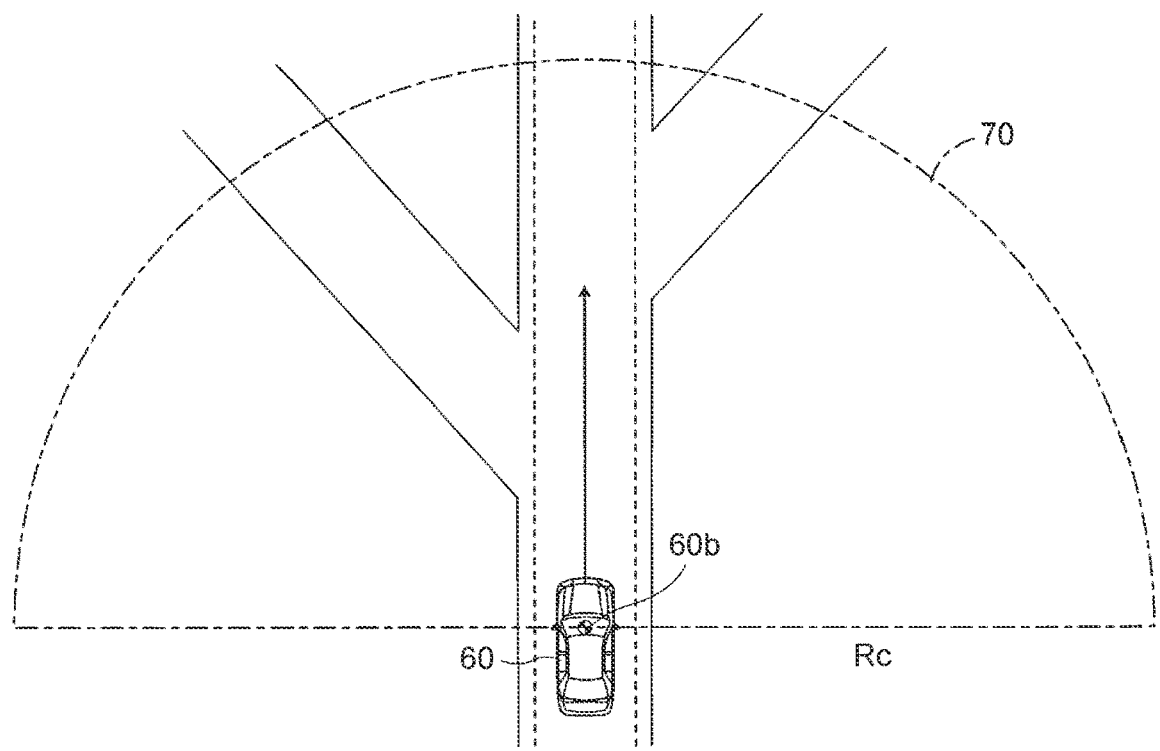
FIG. 12 shows a situation in which there are two service roads and the number Nr of selectable lanes is three.

In step S130, the CPU determines the number Nr of selectable lanes within a range of a predetermined distance from the vehicle, based on road information around the vehicle 60 acquired by the navigation device 50, and the like. The range of the predetermined distance may be, for example, as shown in FIGS. 11 and 12, a fan-shaped area 70 that is an angular range of 180 degrees on a side in front of the vehicle within a range of a reference radius Rc from the center of gravity 60b, which is the reference position of the vehicle 60. The reference radius Rc is a positive constant value, but may be variably set according to the vehicle velocity V such as to become larger as the vehicle velocity V becomes higher.

In cases of the examples shown in FIGS. 11 and 12, it is determined that the number Nr of lanes is two and three, respectively. Note that when there is a plurality of lanes in one way, "the number of the lanes in one way—1" may be counted in the number Nr of selectable lanes.

Figure 7:
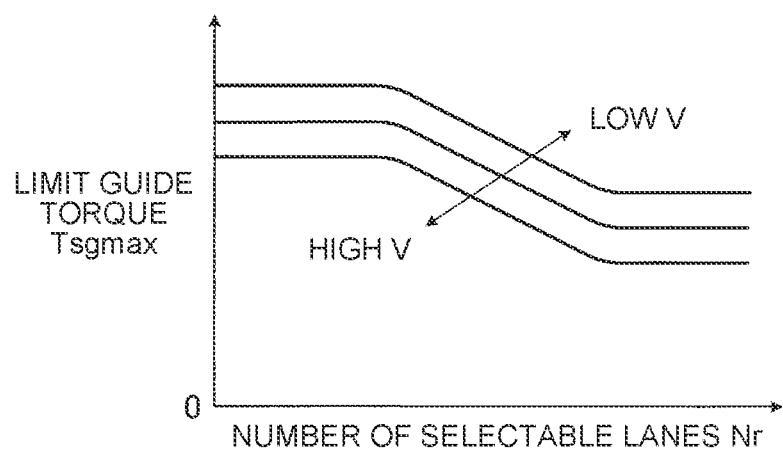
FIG. 7 is a map for calculating a limit guide torque Tsgmax, based on the number Nr of selectable lanes and the vehicle velocity V.

Further in step S130, the CPU calculates a limit guide torque Tsgmax by referring to the map shown in FIG. 7, based on the number Nr of selectable lanes. The limit guide torque Tsgmax is calculated such as to become smaller as the number Nr of selectable lanes becomes larger, and to become smaller as the vehicle velocity V becomes higher, as shown in FIG. 7.

In step S140, the CPU determines whether or not the absolute value of the target steering guide torque Tsgt calculated in step S90 exceeds the limit guide torque Tsgmax. The CPU advances the steering reaction torque control to step S160 when negative determination is made, and advances the steering reaction torque control to step S150 when positive determination is made.

In step S150, the CPU limits the target steering guide torque Tsgt based on the limit guide torque Tsgmax such that the absolute value of the target steering guide torque Tsgt becomes the limit guide torque Tsgmax.

In step S160, the CPU calculates the basic steering reaction torque Treb that should be applied to the steering wheel 20, based on the steering angle $\theta$, the differential value of the steering angle $\theta$, the second order differential value of the steering angle $\theta$, and the vehicle velocity V, in an arbitrary manner publicly known in the art.

In step S170, the CPU calculates the target steering reaction torque Tret as the sum (Treb+Tsgt) of the basic steering reaction torque Treb and the target steering guide torque Tsgt.

In step S180, the CPU controls the reaction force actuator 24 such that the steering reaction torque Tre generated by the reaction force actuator 24 becomes the target steering reaction torque Tret. Accordingly, the steering reaction torque corresponding to the target steering reaction torque Tret is applied to the steering wheel 20, whereby the steering guide torque Tsg corresponding to the target steering guide torque Tsgt is applied to the steering wheel 20.

Operation and Effects of the Embodiment

According to the embodiment, when a travel path of a vehicle can be normally estimated (step S10), the curve curvature ppre at the prediction position Ppre is obtained, and the target steering angle $\theta t$ for the vehicle 60 to travel along a curve of a travel road is calculated (steps S20 to S70). The target basic steering guide torque Tsgtb is calculated based on the steering angle deviation $\Delta\theta$ that is the deviation ($\theta-\theta t$) between the actual steering angle $\theta$ and the target steering angle $\theta t$ (steps S80, S90). The target steering guide torque Tsgt is calculated as the product KvKaTsgtb of the vehicle velocity factor Kv, the correction factor Ka, and the target basic steering guide torque Tsgtb (steps S100 to S120).

Further, the target steering reaction torque Tret is calculated as the sum of the basic steering reaction torque Treb that should be applied to the steering wheel 20 and the target steering guide torque Tsgt, and the reaction force actuator 24 is controlled such that the steering reaction torque Tre becomes the target steering reaction torque Tret (steps S160 to S180).

As described above, when a driver intends to deviate from a current lane, for example, to change lanes or to change a course into a service road, deceleration operation is performed, and the vehicle velocity V therefore decreases. According to the embodiment, the vehicle velocity factor Kv is variably set to a value that is not larger than one and is not smaller than zero according to the vehicle velocity V such as to become smaller as the vehicle velocity V becomes lower, as shown in FIG. 5.

Accordingly, according to the embodiment, as a probability of a change in the lane in which the vehicle 60 travels becomes higher, as in the case where the driver intends to deviate from a current lane, the vehicle velocity factor Kv decreases and the size of the target steering guide torque Tsgt becomes smaller, and hence the target steering guide torque Tsgt prompting the vehicle 60 to travel along the current lane decreases. Accordingly, in a situation where the driver intends to deviate from the current lane, the possibility can be reduced that a steering guide torque corresponding to the target steering guide torque Tsgt interferes with steering operation by the driver, so that the possibility can be reduced that the driver feels steering resistance caused by the steering guide torque.

Note that the target steering guide torque Tsgt is small and the steering guide torque Tsg is therefore small also when the vehicle 60 travels at low speed. However, since the basic steering reaction torque Treb is not increased, the driver does not feel difficulty in steering operation.

According to the embodiment in particular, in step S110, the correction factor Ka is calculated to be a positive value equal to or smaller than one, and such as to become smaller as the deceleration amount ΔV becomes larger, and in step S120, the target steering guide torque Tsgt is calculated as the product of the vehicle velocity factor Kv, the correction factor Ka, and the basic steering reaction torque Treb. Accordingly, the larger the deceleration amount of the vehicle is, the smaller the size of the target steering guide torque Tsgt is made, whereby the possibility that the steering guide torque interferes with steering operation by the driver can be effectively reduced.

Moreover, according to the embodiment, since one map suffices to calculate the vehicle velocity factor Kv as shown in FIG. 5, it is not necessary to set a plurality of maps that differ with vehicle velocity ranges like maps shown in FIG. 9 in a modification, which will be described later. Accordingly, the target steering guide torque Tsgt can be easily calculated, compared to the modification.

Modification

Figure 8:
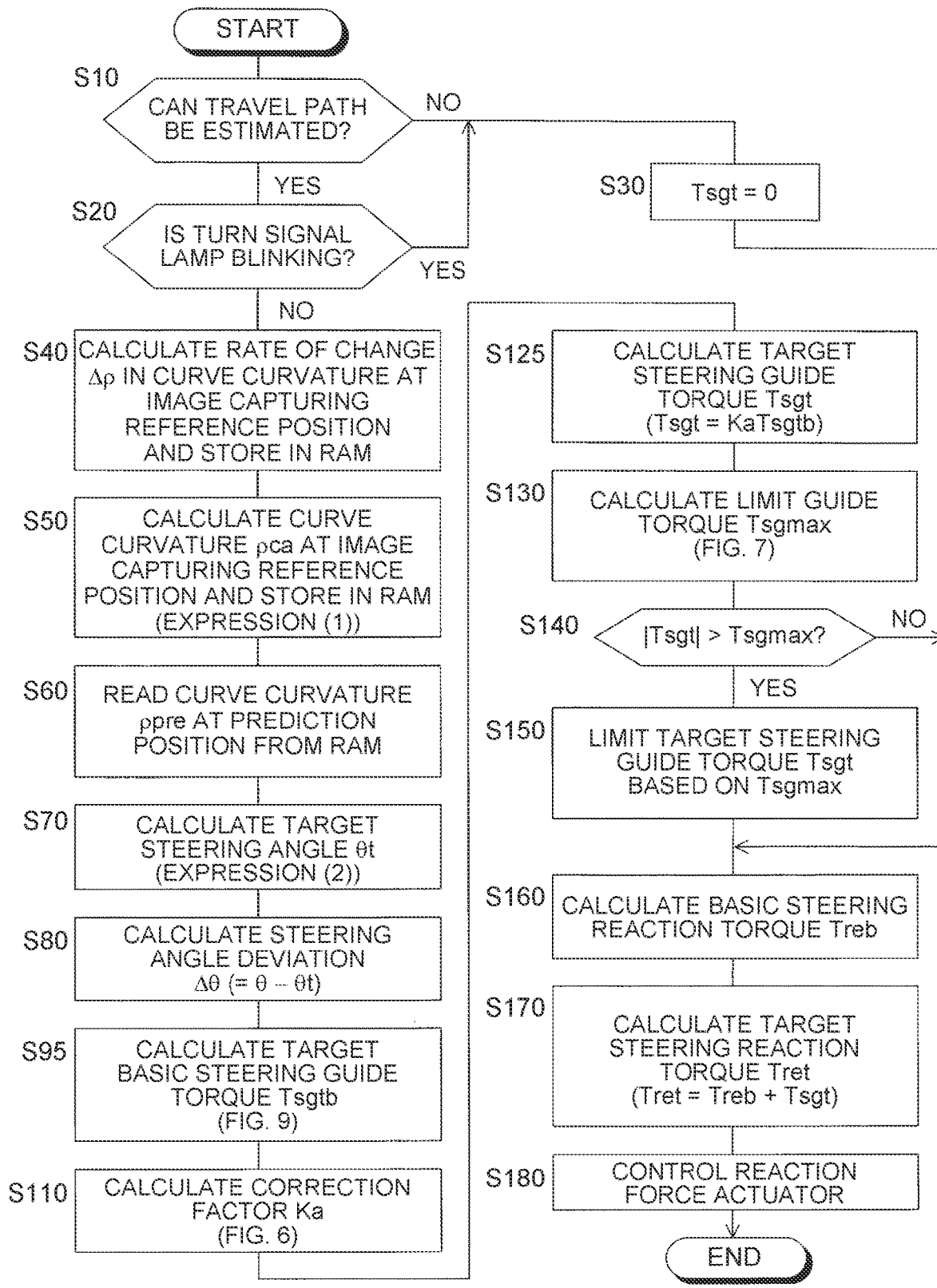
FIG. 8 is a flowchart showing a steering reaction torque control routine in a modification.

FIG. 8 is a flowchart showing a steering reaction torque control routine in the modification. In FIG. 8, the same steps as the steps shown in FIG. 3 are denoted by the same step numbers as the step numbers given in FIG. 3.

Figure 9:
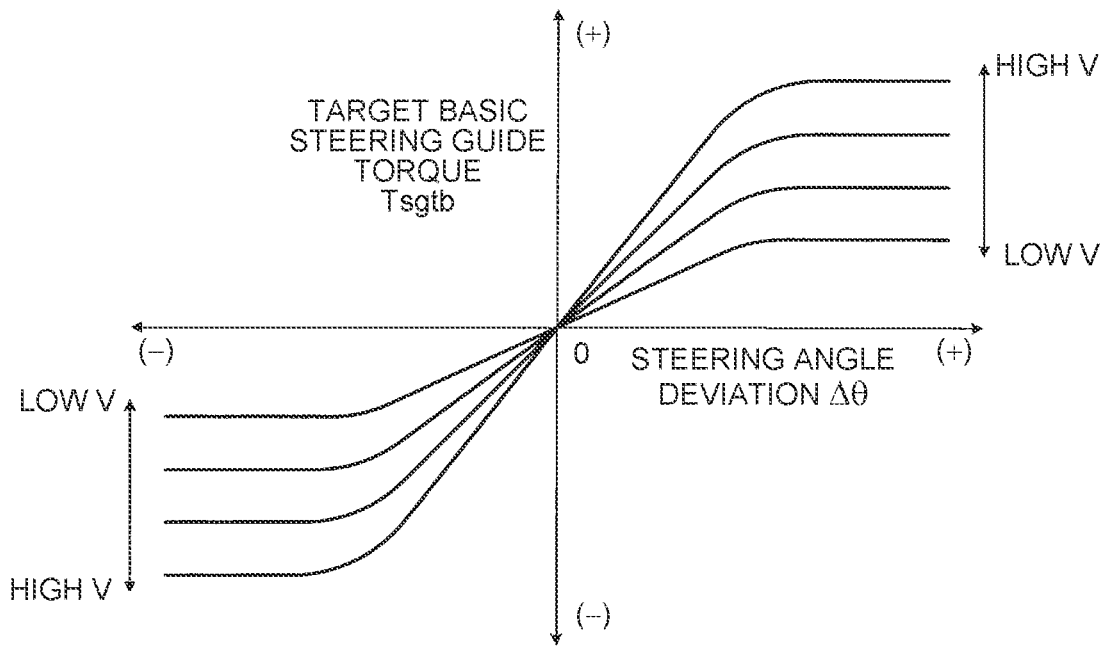
FIG. 9 is a map for calculating the target basic steering guide torque Tsgtb, based on the steering angle deviation Δθ and the vehicle velocity V.

In the modification, the CPU executes step S95 in place of step S90, and calculates the target basic steering guide torque Tsgtb by referring to a map shown in FIG. 9, based on the steering angle deviation Δθ and the vehicle velocity V. As shown in FIG. 9, the target basic steering guide torque Tsgtb is calculated such as to become larger as the absolute value of the steering angle deviation Δθ becomes larger and such that the absolute value of the target basic steering guide torque Tsgtb becomes smaller as the vehicle velocity V becomes lower.

Moreover, the CPU executes step S125 in place of step S120, and calculates the target steering guide torque Tsgt guiding steering by the driver when the vehicle 60 travels along a curve of a travel road, as the product KaTsgtb of the correction factor Ka and the target basic steering guide torque Tsgtb.

According to the modification, since the absolute value of the target basic steering guide torque Tsgtb becomes smaller as the vehicle velocity V becomes lower as shown in FIG. 9, the absolute value of the target steering guide torque Tsgt becomes smaller as the vehicle velocity V becomes lower. Accordingly, when the vehicle velocity V decreases as a result of the driver decelerating the vehicle 60 with the intention of deviating from a current lane, the target steering guide torque Tsgt that prompts the vehicle 60 to travel along the current lane decreases. Accordingly, in a situation where the driver intends to deviate from the current lane, the possibility can be reduced that a steering guide torque corresponding to the target steering guide torque Tsgt interferes with steering operation by the driver, so that the possibility can be reduced that the driver feels steering resistance caused by the steering guide torque.

According to the modification in particular, in step S110, the correction factor Ka is calculated to be a positive value equal to or smaller than one, and such as to become smaller as the deceleration amount ΔV becomes larger, and in step S125, the target steering guide torque Tsgt is calculated as the product of the correction factor Ka and the target basic steering guide torque Tsgtb. Accordingly, the larger the deceleration amount of the vehicle is, the smaller the size of the target steering guide torque Tsgt is made, whereby the possibility that the steering guide torque interferes with steering operation by the driver can be effectively reduced.

Moreover, according to the embodiment and the modification, in step S130, the number Nr of selectable lanes within the range of the predetermined distance from the vehicle 60 is determined, and the limit guide torque Tsgmax is calculated such as to become smaller as the number Nr of selectable lanes becomes larger. Further, in steps S140 and S150, the target steering guide torque Tsgt is limited based on the limit guide torque Tsgmax such that the absolute value of the target steering guide torque Tsgt does not exceed the limit guide torque Tsgmax.

Accordingly, the target steering guide torque can be adjusted such that as the number Nr of selectable lanes becomes larger and the probability of a change in the lane in which the vehicle 60 travels therefore becomes higher, the size of the target steering guide torque Tsgt becomes smaller.

Furthermore, according to the embodiment and the modification, the limit guide torque Tsgmax is calculated such as to become smaller as the vehicle velocity V becomes higher, as shown in FIG. 7. Accordingly, the target steering guide torque can be adjusted such that the size of the target steering guide torque Tsgt becomes smaller as the vehicle velocity V becomes higher.

Although the disclosure has been described in detail hereinbefore by using a specific embodiment, the disclosure is not limited to the embodiment, and it is obvious to those skilled in the art that other various embodiments can be made within the scope of the disclosure.

For example, in the embodiment, the target steering guide torque Tsgt is calculated as the product KvKaTsgtb of the vehicle velocity factor Kv, the correction factor Ka, and the target basic steering guide torque Tsgtb in step S120. However, the correction factor Ka may be omitted, and the target steering guide torque Tsgt may be calculated as a product KvTsgtb.

In the modification, the target steering guide torque Tsgt is calculated as the product KaTsgtb of the correction factor Ka and the target basic steering guide torque Tsgtb in step S125. However, the correction factor Ka may be omitted, and the target steering guide torque Tsgt may be set to the target basic steering guide torque Tsgtb.

In the embodiment and the modification, the limit guide torque Tsgmax is variably set according to the vehicle velocity V such as to become smaller as the vehicle velocity V becomes higher, as shown in FIG. 7. However, the limit guide torque Tsgmax does not need to be variably set according to the vehicle velocity V.

Figure 10:
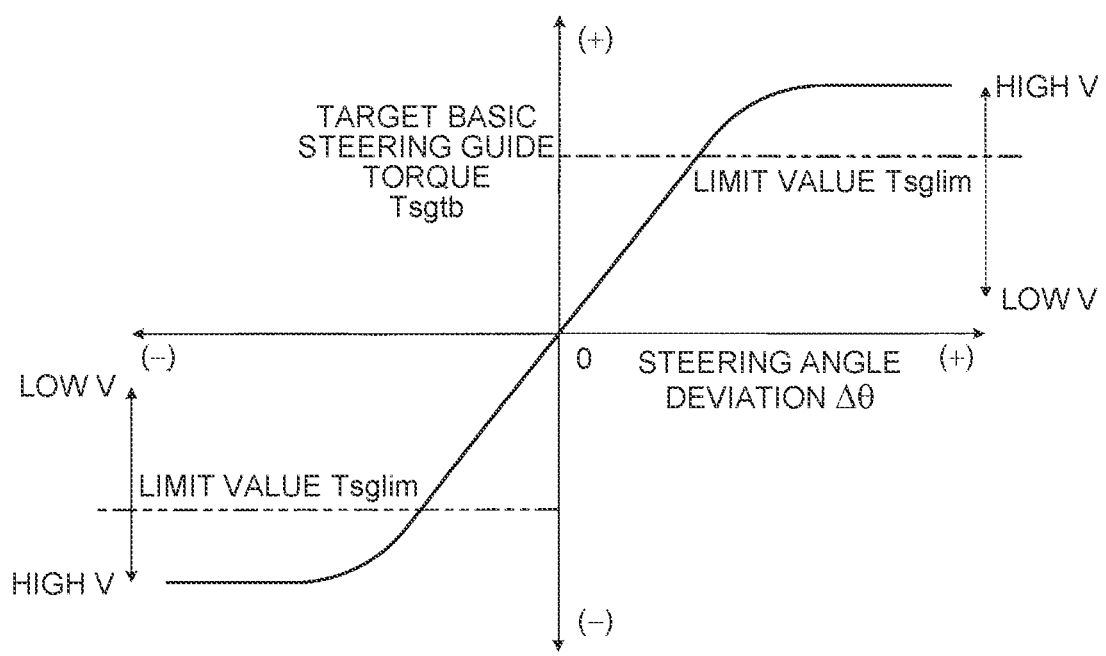
FIG. 10 is a map for calculating the target basic steering guide torque Tsgtb, based on the steering angle deviation Δθ and a limit value Tsglim.

In the modification, the target basic steering guide torque Tsgtb is calculated by referring to the map shown in FIG. 9, based on the steering angle deviation Δθ and the vehicle velocity V. However, the target basic steering guide torque Tsgtb may be calculated by referring to a map shown in FIG. 10, based on the steering angle deviation Δθ, and the target basic steering guide torque Tsgtb may be limited based on a limit value Tsglim, the absolute value of which becomes smaller as the vehicle velocity V becomes lower.

In the embodiment and the modification, the steering guide torque control apparatus 10 is configured as a steering reaction torque control apparatus including the steer-by-wire steering system 12. However, the steering guide torque control apparatus 10 may be configured as a steering reaction torque control apparatus in which the steering wheel and the left and right front tire wheels are mechanically connected, and that includes an electric power steering system. In such a case, a target steering assistance torque Tsat is calculated as the sum of a basic steering assistance torque Tsab, which is calculated based on steering torque and vehicle velocity, and the target steering guide torque Tsgt. Further, the electric power steering system is controlled such that a steering assistance torque Tsa generated by the electric power steering system becomes the target steering assistance torque Tsat.

What is claimed is:

1. A vehicle steering guide torque control apparatus comprising:
   a steering input member on which steering operation is performed by a driver;
   a turning device that turns turning tire wheels according to a steering operation amount applied to the steering input member;
   a torque application device that applies steering guide torque to the steering input member;
   a control unit that controls the torque application device; and
   an image capturing device that acquires an image in front of a vehicle, wherein
      the control unit is configured to estimate a curvature of a lane in front of the vehicle for causing the vehicle to travel along the lane, based on the image acquired by the image capturing device, calculate a target steering operation amount, based on the curvature of the lane, calculate a target steering guide torque guiding steering by the driver, based on a deviation between the target steering operation amount and an actual steering operation amount, such that the actual steering operation amount comes within a predetermined steering operation amount range including the target steering operation amount, and control the torque application device such that the steering guide torque becomes the target steering guide torque, and
      the control unit is further configured to estimate a probability that the driver performs steering operation to deviate from the lane, and adjust the target steering guide torque, according to the probability, such that the target steering guide torque becomes smaller as the probability becomes higher.

2. The vehicle steering guide torque control apparatus according to claim 1, wherein the control unit is configured to acquire information on vehicle velocity, and determine that the lower the vehicle velocity is, the higher the probability is.

3. The vehicle steering guide torque control apparatus according to claim 1, wherein the control unit is configured to acquire information on a degree of deceleration of the vehicle, and determine that the higher the degree of deceleration of the vehicle is, the higher the probability is.

4. The vehicle steering guide torque control apparatus according to claim 1, wherein the control unit is configured to acquire information on the number of selectable lanes within a range of a predetermined distance from the vehicle, set a limit guide torque such that the limit guide torque becomes smaller as the number of selectable lanes becomes larger, and limit the target steering guide torque such that a size of the target steering guide torque does not exceed the limit guide torque.

5. The vehicle steering guide torque control apparatus according to claim 4, wherein the control unit is configured to acquire information on vehicle velocity, and make the limit guide torque smaller as the vehicle velocity becomes higher.

* * * * *